United States Patent
Jamieson et al.

(10) Patent No.: US 11,863,279 B2
(45) Date of Patent: Jan. 2, 2024

(54) QUANTUM OPTIMIZATION FOR MULTIPLE INPUT AND MULTIPLE OUTPUT (MIMO) PROCESSING

(71) Applicants: Trustees of Princeton University, Princeton, NJ (US); UNIVERSITIES SPACE RESEARCH ASSOCIATION, Columbia, KY (US)

(72) Inventors: Kyle Jamieson, Princeton, NJ (US); Minsung Kim, Princeton, NJ (US); Davide Venturelli, San Francisco, CA (US)

(73) Assignees: TRUSTEES OF PRINCETON UNIVERSITY, Princeton, NJ (US); UNIVERSITIES SPACE RESEARCH ASSOCIATION, Columbia, KY (US)

( * ) Notice: Subject to any disclaimer, the term of this patent is extended or adjusted under 35 U.S.C. 154(b) by 0 days.

(21) Appl. No.: 17/606,947

(22) PCT Filed: May 11, 2020

(86) PCT No.: PCT/US2020/032398
§ 371 (c)(1),
(2) Date: Oct. 27, 2021

(87) PCT Pub. No.: WO2020/227721
PCT Pub. Date: Nov. 12, 2020

(65) Prior Publication Data
US 2022/0209844 A1    Jun. 30, 2022

Related U.S. Application Data

(60) Provisional application No. 62/845,642, filed on May 9, 2019.

(51) Int. Cl.
*H04B 7/08* (2006.01)
*H04B 7/0426* (2017.01)
(Continued)

(52) U.S. Cl.
CPC ........... H04B 7/0854 (2013.01); H04B 7/043 (2013.01); H04B 7/0452 (2013.01);
(Continued)

(58) Field of Classification Search
CPC .... H04B 7/0854; H04B 7/043; H04B 7/0452; H04B 7/0617; H04L 1/0054; H04L 1/06
See application file for complete search history.

(56) References Cited

U.S. PATENT DOCUMENTS 10,346,748 B2 * 7/2019 Aspuru-Guzik ....... G06N 10/00
10,637,142 B1 * 4/2020 Tran ........................ F21S 8/086
(Continued)

OTHER PUBLICATIONS

Fujitsu: https://www.fujitsu.com/global/digitalannealer/ retrieved online on Apr. 20, 2022.
(Continued)

*Primary Examiner* — Vineeta S Panwalkar
(74) *Attorney, Agent, or Firm* — FisherBroyles, LLP

(57) ABSTRACT

Systems and methods herein provide for Multi-Input/Multi-Output (MIMO) processing. In one embodiment, a MIMO system comprises a receiver operable to receive a plurality of spatially multiplexed data streams. The system also comprises a processor operable to embed a maximum likelihood (ML) detection algorithm onto a quantum annealer, and to decode the spatially multiplexed data streams via the embedded ML to detect data bits of a plurality of users.

22 Claims, 11 Drawing Sheets

(51) Int. Cl.
  *H04B 7/0452* (2017.01)
  *H04B 7/06* (2006.01)
  *H04L 1/06* (2006.01)
  *H04L 1/00* (2006.01)

(52) U.S. Cl.
  CPC ......... *H04B 7/0617* (2013.01); *H04L 1/0054* (2013.01); *H04L 1/06* (2013.01)

(56) References Cited

U.S. PATENT DOCUMENTS

| | | | |
|---|---|---|---|
| 2015/0032994 A1 | 1/2015 | Chudak | |
| 2016/0338075 A1* | 11/2016 | McKibben | H04L 25/00 |
| 2019/0020421 A1 | 1/2019 | Polyakov | |
| 2019/0392326 A1* | 12/2019 | Okada | G06N 10/00 |
| 2020/0050959 A1* | 2/2020 | Ashrafi | H04L 9/0858 |
| 2020/0374033 A1* | 11/2020 | Chen | H04L 1/0047 |

OTHER PUBLICATIONS

International Preliminary Report on Patentability dated Nov. 2, 2021 in International Application No. PCT/US2020/032398.

International Search Report dated Aug. 6, 2020 in International Application No. PCT/US2020/032398.

Memcomputing: https://arxiv.org/abs/1802.06928, "Memcomputing: Leveraging memory and physics to compute efficiently" May 6, 2018.

P. L. McMahon et al., Science10.1126/science.aah5178 (2016), "A fully-programmable 100-spin coherent Ising machine with all-to-all connections".

S. Hadfield, et al., "From the Quantum Approximate Optimization Algorithm to a Quantum Alternating Operator Ansatz" arXiv:1709.03489 [quant-ph] Feb. 28, 2019.

Written Opinion of the International Searching Authority dated Aug. 6, 2020 in International Application No. PCT/US2020/032398.

* cited by examiner $$H = \begin{vmatrix} h_{11} & h_{12} \\ h_{21} & h_{22} \end{vmatrix} = \begin{vmatrix} h_{I,11} & h_{I,12} \\ h_{I,21} & h_{I,22} \end{vmatrix} + j \begin{vmatrix} h_{Q,11} & h_{Q,12} \\ h_{Q,21} & h_{Q,22} \end{vmatrix},$$

$$y = \begin{vmatrix} y_1 \\ y_2 \end{vmatrix} = \begin{vmatrix} y_{I,1} \\ y_{I,2} \end{vmatrix} + j \begin{vmatrix} y_{Q,1} \\ y_{Q,2} \end{vmatrix} \text{ and } v = \begin{vmatrix} v_1 \\ v_2 \end{vmatrix}.$$

*FIG. 3A*

$$\|y - Hv\|^2 = \left\| \begin{vmatrix} y_1 \\ y_2 \end{vmatrix} - \begin{vmatrix} h_{11} & h_{12} \\ h_{21} & h_{22} \end{vmatrix} \begin{vmatrix} v_1 \\ v_2 \end{vmatrix} \right\|^2 = \left\| \begin{matrix} y_1 - h_{11}v_1 - h_{12}v_2 \\ y_2 - h_{21}v_1 - h_{22}v_2 \end{matrix} \right\|^2$$

$$= \left\| \begin{matrix} (y_{I,1} - h_{I,11}v_1 - h_{I,12}v_2) + j(y_{Q,1} - h_{Q,11}v_1 - h_{Q,12}v_2) \\ (y_{I,2} - h_{I,21}v_1 - h_{I,22}v_2) + j(y_{Q,2} - h_{Q,21}v_1 - h_{Q,22}v_2) \end{matrix} \right\|^2$$

$$\|y - Hv\|^2 = \left\| \begin{vmatrix} y_1 \\ y_2 \end{vmatrix} - \begin{vmatrix} h_{11} & h_{12} \\ h_{21} & h_{22} \end{vmatrix} \begin{vmatrix} T(q_1) \\ T(q_2) \end{vmatrix} \right\|^2$$

$$\hat{q}_1, \hat{q}_2 = \arg \min_{q_1, q_2} Q_{11} q_1 + Q_{22} q_2 + Q_{12} q_1 q_2, \text{ where}$$

$$f_i(H, y) = \begin{cases} \text{case } i = 4n - 3: \\ -4\left(H^I_{(:,\lceil i/4 \rceil)} \cdot y^I\right) - 4\left(H^Q_{(:,\lceil i/4 \rceil)} \cdot y^Q\right), \\ \text{case } i = 4n - 2: \\ -2\left(H^I_{(:,\lceil i/4 \rceil)} \cdot y^I\right) - 2\left(H^Q_{(:,\lceil i/4 \rceil)} \cdot y^Q\right), \\ \text{case } i = 4n - 1: \\ -4\left(H^I_{(:,\lceil i/4 \rceil)} \cdot y^Q\right) + 4\left(H^Q_{(:,\lceil i/4 \rceil)} \cdot y^I\right), \\ \text{case } i = 4n: \\ -2\left(H^I_{(:,\lceil i/4 \rceil)} \cdot y^Q\right) + 2\left(H^Q_{(:,\lceil i/4 \rceil)} \cdot y^I\right). \end{cases}$$

FIG. 8A $$g_{ij}(\mathbf{H}) = \begin{cases}
\text{case } i = 4n - 3: \\
\quad \begin{cases}
\text{case } j = 4n' - 3: \\
\quad 8\left(\mathbf{H}^I_{(i,\lceil i/4\rceil)} \cdot \mathbf{H}^I_{(i,\lceil j/4\rceil)}\right) + 8\left(\mathbf{H}^Q_{(i,\lceil i/4\rceil)} \cdot \mathbf{H}^Q_{(i,\lceil j/4\rceil)}\right), \\
\text{case } j = 4n' - 2: \\
\quad 4\left(\mathbf{H}^I_{(i,\lceil i/4\rceil)} \cdot \mathbf{H}^I_{(i,\lceil j/4\rceil)}\right) + 4\left(\mathbf{H}^Q_{(i,\lceil i/4\rceil)} \cdot \mathbf{H}^Q_{(i,\lceil j/4\rceil)}\right), \\
\text{case } j = 4n' - 1: \\
\quad -8\left(\mathbf{H}^I_{(i,\lceil i/4\rceil)} \cdot \mathbf{H}^Q_{(i,\lceil j/4\rceil)}\right) + 8\left(\mathbf{H}^I_{(i,\lceil j/4\rceil)} \cdot \mathbf{H}^Q_{(i,\lceil i/4\rceil)}\right), \\
\text{case } j = 4n': \\
\quad -4\left(\mathbf{H}^I_{(i,\lceil i/4\rceil)} \cdot \mathbf{H}^Q_{(i,\lceil j/4\rceil)}\right) + 4\left(\mathbf{H}^I_{(i,\lceil j/4\rceil)} \cdot \mathbf{H}^Q_{(i,\lceil i/4\rceil)}\right),
\end{cases} \\
\text{case } i = 4n - 2: \\
\quad \begin{cases}
\text{case } j = 4n' - 3: \\
\quad 4\left(\mathbf{H}^I_{(i,\lceil i/4\rceil)} \cdot \mathbf{H}^I_{(i,\lceil j/4\rceil)}\right) + 4\left(\mathbf{H}^Q_{(i,\lceil i/4\rceil)} \cdot \mathbf{H}^Q_{(i,\lceil j/4\rceil)}\right), \\
\text{case } j = 4n' - 2: \\
\quad 2\left(\mathbf{H}^I_{(i,\lceil i/4\rceil)} \cdot \mathbf{H}^I_{(i,\lceil j/4\rceil)}\right) + 2\left(\mathbf{H}^Q_{(i,\lceil i/4\rceil)} \cdot \mathbf{H}^Q_{(i,\lceil j/4\rceil)}\right), \\
\text{case } j = 4n' - 1: \\
\quad -4\left(\mathbf{H}^I_{(i,\lceil i/4\rceil)} \cdot \mathbf{H}^Q_{(i,\lceil j/4\rceil)}\right) + 4\left(\mathbf{H}^I_{(i,\lceil j/4\rceil)} \cdot \mathbf{H}^Q_{(i,\lceil i/4\rceil)}\right), \\
\text{case } j = 4n': \\
\quad -2\left(\mathbf{H}^I_{(i,\lceil i/4\rceil)} \cdot \mathbf{H}^Q_{(i,\lceil j/4\rceil)}\right) + 2\left(\mathbf{H}^I_{(i,\lceil j/4\rceil)} \cdot \mathbf{H}^Q_{(i,\lceil i/4\rceil)}\right),
\end{cases} \\
\text{case } i = 4n - 1: \\
\quad \begin{cases}
\text{case } j = 4n' - 3: \\
\quad 8\left(\mathbf{H}^I_{(i,\lceil i/4\rceil)} \cdot \mathbf{H}^Q_{(i,\lceil j/4\rceil)}\right) - 8\left(\mathbf{H}^I_{(i,\lceil j/4\rceil)} \cdot \mathbf{H}^Q_{(i,\lceil i/4\rceil)}\right), \\
\text{case } j = 4n' - 2: \\
\quad 4\left(\mathbf{H}^I_{(i,\lceil i/4\rceil)} \cdot \mathbf{H}^Q_{(i,\lceil j/4\rceil)}\right) - 4\left(\mathbf{H}^I_{(i,\lceil j/4\rceil)} \cdot \mathbf{H}^Q_{(i,\lceil i/4\rceil)}\right), \\
\text{case } j = 4n' - 1: \\
\quad 8\left(\mathbf{H}^I_{(i,\lceil i/4\rceil)} \cdot \mathbf{H}^I_{(i,\lceil j/4\rceil)}\right) + 8\left(\mathbf{H}^Q_{(i,\lceil i/4\rceil)} \cdot \mathbf{H}^Q_{(i,\lceil j/4\rceil)}\right), \\
\text{case } j = 4n': \\
\quad 4\left(\mathbf{H}^I_{(i,\lceil i/4\rceil)} \cdot \mathbf{H}^I_{(i,\lceil j/4\rceil)}\right) + 4\left(\mathbf{H}^Q_{(i,\lceil i/4\rceil)} \cdot \mathbf{H}^Q_{(i,\lceil j/4\rceil)}\right),
\end{cases} \\
\text{case } i = 4n: \\
\quad \begin{cases}
\text{case } j = 4n' - 3: \\
\quad 4\left(\mathbf{H}^I_{(i,\lceil i/4\rceil)} \cdot \mathbf{H}^Q_{(i,\lceil j/4\rceil)}\right) - 4\left(\mathbf{H}^I_{(i,\lceil j/4\rceil)} \cdot \mathbf{H}^Q_{(i,\lceil i/4\rceil)}\right), \\
\text{case } j = 4n' - 2: \\
\quad 2\left(\mathbf{H}^I_{(i,\lceil i/4\rceil)} \cdot \mathbf{H}^Q_{(i,\lceil j/4\rceil)}\right) - 4\left(\mathbf{H}^I_{(i,\lceil j/4\rceil)} \cdot \mathbf{H}^Q_{(i,\lceil i/4\rceil)}\right), \\
\text{case } j = 4n' - 1: \\
\quad 4\left(\mathbf{H}^I_{(i,\lceil i/4\rceil)} \cdot \mathbf{H}^I_{(i,\lceil j/4\rceil)}\right) + 4\left(\mathbf{H}^Q_{(i,\lceil i/4\rceil)} \cdot \mathbf{H}^Q_{(i,\lceil j/4\rceil)}\right), \\
\text{case } j = 4n': \\
\quad 2\left(\mathbf{H}^I_{(i,\lceil i/4\rceil)} \cdot \mathbf{H}^I_{(i,\lceil j/4\rceil)}\right) + 2\left(\mathbf{H}^Q_{(i,\lceil i/4\rceil)} \cdot \mathbf{H}^Q_{(i,\lceil j/4\rceil)}\right),
\end{cases}
\end{cases}$$

*FIG. 8B*

$$-\sum_{i=1}^{N}\left[\sum_{c=1}^{\lceil N/4\rceil} s_{ic}s_{i(c+1)}\right]$$

$$+\sum_{i=1}^{N}\left(\frac{f_i}{|J_F|\left(\lceil\frac{N}{4}\rceil+1\right)}\right)\left[\sum_{c=1}^{\lceil N/4\rceil+1} s_{ic}\right]$$

$$+\sum_{i,j=1}^{N}\frac{g_{ij}}{|J_F|}\sum_{(c_i,c_j)\in\delta_{ij}} s_{ic_i}s_{jc_j}$$

*FIG. 11*

QUANTUM OPTIMIZATION FOR MULTIPLE INPUT AND MULTIPLE OUTPUT (MIMO) PROCESSING

CROSS REFERENCE TO RELATED APPLICATIONS

This patent application is a national stage application of International Application No. PCT/US2020/032398, filed May 11, 2020, which claims priority to, and thus the benefit of an earlier filing date from, U.S. Provisional Patent Application No. 62/845,642 (filed May 9, 2019), the contents of each of which are hereby incorporated by reference.

STATEMENT REGARDING FEDERALLY SPONSORED RESEARCH OR DEVELOPMENT

This invention was made with government support under Grant Nos. CNS-1824357 and CNS-1824470 awarded by the National Science Foundation. The government has certain rights in the invention.

BACKGROUND

Data can be wirelessly transferred (e.g., over Radio Frequency, "RF") between devices in a variety of ways. For example, users may transmit and/or receive data with their devices (user equipment, or "UEs") across the Internet via a wireless access point (WAP) using Wi-Fi protocols and/or via a radio access networks (RAN) and base stations (eNodeBs) using cellular telephony protocols, such as 3G, 4G, Long Term Evolution (LTE), 5G, and the like. The demand for wireless data, however, continually outpaces the supply. Accordingly, wireless providers are continually exploring new technologies to provide an ever growing pool of users with faster access to data.

One technology includes Multi-Input/Multi-Output (MIMO). MIMO is a technique for increasing the capacity of a radio link using multiple transmission and receiving antennas. More specifically, MIMO is a technique for sending and receiving more than one data signal simultaneously over the same radio channel by exploiting multipath propagation. MIMO allows overall data rates to be effectively increased via the transmission and reception of multiple data streams.

In MIMO, the channel between the transmitter and receiver may be estimated from orthogonal pilot sequences such that data streams may be properly identified. Previously, this channel estimation was performed in the UEs. But, recent developments, such as massive MIMO (i.e., a large scale form of multiuser MIMO, or "MU-MIMO") increase a number of antennas and thus the complexity of the channel. MIMO processing may be performed at WAPs, RANs, and eNodeBs (collectively "wireless connection points", or WCPs). However, as the number of antennas and the number of UEs accessing a WCP increase, so does the complexity of the processing. Faster and more accurate detection processing techniques are needed to keep pace with increasingly complex MIMO processing.

SUMMARY

Systems and methods herein provide for MIMO processing, and more specifically, MIMO detection processing for spatial multiplexing. In one embodiment, a MIMO system comprises a receiver operable to receive a plurality of spatially multiplexed data streams. The system also comprises a processor operable to embed a maximum likelihood (ML) detection algorithm onto a quantum annealer (e.g., a quadratic form of the ML detection algorithm's objective function such that quantum annealing may solve a corresponding optimization problem), and to decode the spatially multiplexed data streams via the embedded ML to detect data bits of a plurality of users.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

FIGS. 3A-3D illustrate various exemplary equations of an ML problem applied to BPSK signaling.

FIGS. 8A and 8B illustrate various exemplary model parameters for a QAM signal.

FIG. 11 illustrates various exemplary parameters for embedding an Ising form onto a quantum annealer.

DETAILED DESCRIPTION OF THE FIGURES

The figures and the following description illustrate specific exemplary embodiments. It will thus be appreciated that those skilled in the art will be able to devise various arrangements that, although not explicitly described or shown herein, embody certain principles and are included within the scope of the embodiments. Furthermore, any examples described herein are intended to aid in understanding the embodiments and are to be construed as being without limitation to such specifically recited examples and conditions. As a result, the embodiments are not limited to any of the examples described below.

The systems and methods herein leverage quantum computing (QC) to perform part of the computation for a MIMO processor (e.g., a decoder). One approach includes quantum annealing. A quantum annealer is an analog computer that uses a metaheuristic for finding a global minimum of an objective function over a given set of candidate solutions/states via quantum fluctuations (e.g., temporary changes in the amount of energy in a point in space). In the exemplary embodiments disclosed herein, a quantum annealer is operable to embed a Maximum Likelihood (ML) algorithm onto quantum bits (qubits) of the quantum annealer to increase a probability and speed of detection of UE data streams in increasingly complex MIMO communications. In some embodiments, the quantum annealer may perform this "ML-MIMO" detection via a D-Wave 2000Q quantum annealer provided by D-Wave systems, Inc. In these embodiments, the quantum annealer may achieve a target bit error rate (BER) (e.g., $10^{-6}$) and a frame error rate (FER) (e.g., $10^{-4}$) in a computation time limit (e.g., 10 to 20 μs of computation time) for a specific number of users and antennas (e.g., 48 user by 48 access point antenna (48×48) MIMO system) employing a modulation scheme (e.g., binary phase shift keyed (BPSK) modulation). Irrespective of the example, the embodiments herein, however, will show that other modulations and signaling types may be used as well. In fact, the embodiments herein may be used with virtually any ML detection algorithm.

Figure 1:
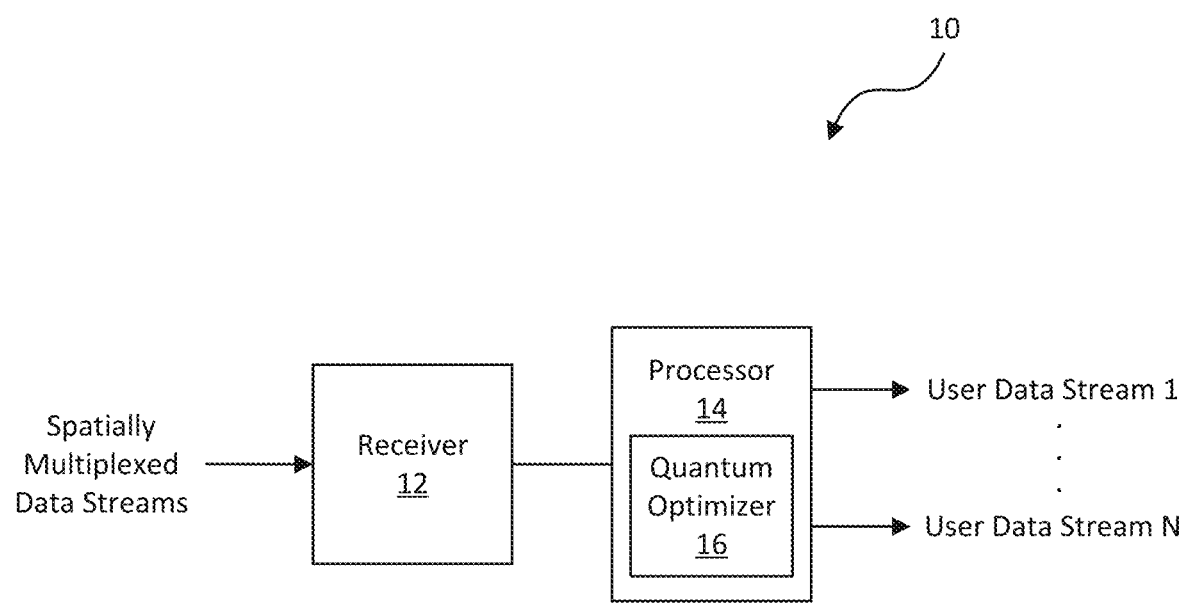
FIG. 1 is a block diagram of an exemplary system for processing MIMO data streams.

In this regard, FIG. 1 is a block diagram of a MIMO processing system 10 operable to process a spatially multiplexed MIMO data stream (e.g., from a plurality of UEs). The MIMO system 10, in this embodiment, includes a receiver 12 that is operable to receive a plurality of spatially multiplexed data streams. For example, the receiver 12 may be part of an MU-MIMO communication system configured with a WCP (e.g., a WAP, a RAN, a cloud RAN, an eNodeB, or the like) to receive such signaling. Thus, the receiver 12 may be configured with or communicatively coupled to a plurality of antennas (e.g., configured as an array).

In some embodiments, the receiver 12 may even be configured to receive such signaling over a coaxial cable, such as that found in cable television headends and networks (e.g., cellular backhaul communications and/or landline signaling). The receiver 12 may be operable to receive/demodulate/demultiplex a variety of modulation and multiplexing schemes including BPSK, quadrature-phase shift keyed (QPSK), quadrature amplitude (QAM), orthogonal frequency division multiplex (OFDM), and the like.

The MIMO processing system 10 also includes a processor 14 that is operable to embed a maximum likelihood (ML) detection algorithm onto a quantum annealer or otherwise quantum optimizer 16, and to decode the spatially multiplexed data streams via the embedded ML to detect a plurality of streams of data bits of a plurality of users (i.e., user data streams 1-N, where the reference "N" indicates an integer greater than "1" and not necessarily equal to any other "N" reference designated herein). Examples of the quantum optimizer 16 include a coherent optical machine, a complementary metal-oxide-semiconductor (CMOS) based digital annealer, a gate model quantum computer, a superconducting based quantum annealer, or the like.

Based on the foregoing, the receiver 12 is any system, device, software, firmware, or combination thereof operable to receive a multiplexed signal. And, the processor 14 is any system, device, software, firmware, or combination thereof operable to perform an ML detection of bit streams within the multiplexed signal.

Figure 2:
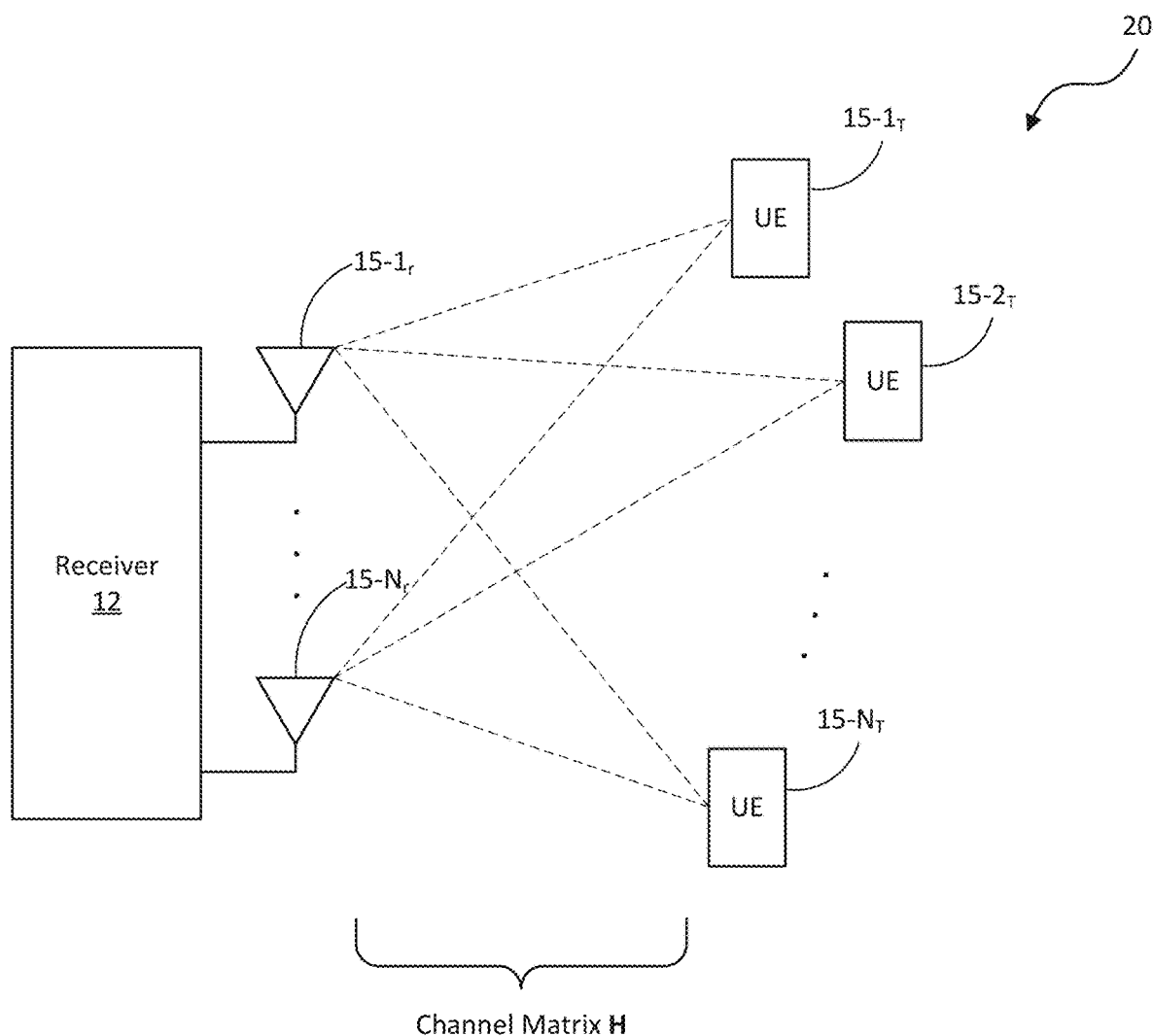
FIG. 2 is a block diagram of an exemplary wireless system for receiving MIMO data.

Before delving into the aspects of compiling (e.g. minor embedding for quantum annealers) the ML detection algorithm onto the quantum optimizer 16 of the processor 14, an introduction into ML detection is provided. For example, in FIG. 2, the WCP 20 may be configured with the receiver 12 of FIG. 1. In this example, suppose there are $N_T$ UEs 15-$1_T$-15-$N_T$ (e.g., an integer greater than "1"), each of which comprises one antenna and sends data bits to antennas 20-$1_r$-20-$N_r$ via OFDM, where $N_r \geq N_T$ and $N_r$ is the number of receiving antennas. Now, consider all of the data bits from the UEs 15 in a vector whose elements each comprise a single UE 15's data bits. The data bits are mapped into a complex valued symbol $\bar{v}$ that is transmitted over a radio channel $\bar{v} = [\bar{v}_1, \bar{v}_2, \ldots \bar{v}_{N_t}]^T \in \mathbb{C}^{N_t}$. Each UEs 15 may send a constellation O of size $|O| = 2^Q$ (e.g., Q bits per symbol). A MIMO decoding problem with an optimal solution is called the "ML solution" and comprises a search over the sets of transmitted symbols, looking for the set that minimizes the error with respect to what has been received by the WCP 20. The solution may be represented as:

$$\bar{v} = [\bar{v}_1, \bar{v}_2, \ldots \bar{v}_{N_t}]^T \in \mathbb{C}^{N_t} \qquad \text{Eq. 1}$$

The processor 14 de-maps the decoded symbols $\bar{v}$ to decoded bits $\bar{b}$. In Eq. 1., $H \in \mathbb{C}^{N_r N_t} = H^I + jH^Q$ is the wireless channel on each OFDM subcarrier and $y \in \mathbb{C}^{N_r}$ $(= H\bar{v} + n)$ is a received set of symbols perturbed by $n \in \mathbb{C}^{N_r}$ (i.e., additive white Gaussian noise, or "AWGN"). A solution thus minimizes detection errors and maximizes throughput (e.g., via throughput optimal decoding).

As an example, a sphere decoder is an ML detector algorithm that reduces complexity with respect to a brute force search by constraining its search to possible sets that lie within a hyper sphere of radius $\sqrt{C}$ centered around y (e.g., Eq. 1 with the constraint $\|y - Hv\|^2 \leq C$). This transforms Eq. 1 into a tree search by QR decomposition of $H = QR$, where Q is orthogonal and R is upper triangular, resulting in $\hat{v} = \arg\min_{v \in O^{N_t}} \|\bar{y} - Rv\|^2$, with $\bar{y} = Q^*y$. The resulting tree has a height of $N_T$, a branching factor of $|O|$, and nodes $1 + \Sigma_{i=1}^{N_T} |O|^i$. ML detection thus becomes the problem of finding a single leaf among $|O|^{N_T}$ with a minimum metric and the corresponding tree path is the ML solution. Thus, the min of Eq. 1 is a search in an exponentially large and spatially transmitted symbols $\{v\}$, despite sphere decoder reductions in the search space size.

The following table illustrates the average number of tree nodes visited to perform ML sphere decoding with UE 15s transmitting modulation symbols on 50 subcarrier's over a 20 MHz, 13 dB SNR (signal to noise ratio) Raleigh channel.

| BPSK | QPSK | 16 - QAM | Complexity (Visited Nodes) |
| --- | --- | --- | --- |
| 12 × 12 | 7 × 7 | 4 × 4 | ≈40 (feasible) |
| 21 × 21 | 11 × 11 | 6 × 6 | ≈270 (possible) |
| 30 × 30 | 15 × 15 | 8 × 8 | ≈1,900 (unfeasible) |

The tables is parameterized based on the number of clients, and the number of antennas at the WCP 20, and modulation to highlight the exponential increase in computation. For example, for a UEs 15 with 16 QAM symbols, 15 UE 15s with QPSK symbols, or 30 UE 15s sending BPSK symbols, the sphere decoder visits close to 2,000 tree nodes, saturating previous architectures, such as those Implement It in silicon. The quantum optimizer 16 improves upon the ML detection of the sphere decoder.

Again, the quantum optimizer 16 could be a specialized analog computer that computes continuously (i.e., rather than in discrete clock cycles) and represents numerical quantities in analog instead of digital quantities. Generally, the quantum optimizer 16 exploits quantum effects such as tunneling, "many-body" delocalization, and quantum relaxation to circumvent computational bottlenecks that may otherwise "trap" Monte Carlo methods and local minima of a solution landscape. The quantum optimizer 16 may be operable to solve non-deterministic polynomial (NP) complete and NP hard optimization problems. In some embodiments, the quantum optimizer 16 can formulate NP hard problems in an Ising model.

In some embodiments, the quantum optimizer 16 could be a quantum circuit algorithm that is run in a gate-model quantum computer to perform optimization, for example by implementing the Quantum Approximate Optimization Algorithm or the Quantum Alternate Operator Ansatz or a Quantum Neural Network.

In some embodiments, the quantum optimizer 16 could be a physical analog machine that is based on coherent optical effects such as those leveraged in degenerate optical parametric oscillators (coherent Ising machine), as built by NTT Corporation or Stanford University.

In some embodiments, the quantum optimizer 16 could be an emulator of quantum annealing or otherwise quantum optimization system, such as a digital annealer built by CMOS technology such as those built by Fujitsu.

The quantum optimizer 16 may initialize each of its N constituent qubits to begin in a superposition state of $1/\sqrt{2}(|0\rangle + |1\rangle)$ that has no classical counterpart.

In the D-Wave quantum annealer, these qubits are metallic circuits in a chip that are maintained in a superconducting state by low temperature and subject to the influence of tailored magnetic fluxes. The collection of N qubits generally encodes all possible 2N outputs in a single state. The initial setting may be achieved by exposing all of the qubits in the chip to a signal A(t) whose magnitude in time is maximal. The system may then implement an objective function which is represented by another signal B(t) ramped up from zero while A(t) his decreased progressively at the same time. The synchronized sequences of the signals A and B and their time dependence is the annealing schedule. The annealing schedule essentially the algorithm of the quantum annealer 16 that needs to be optimized so that, at the end of a run (i.e., when B(t)=max and A(t)=0), each qubit assumes either a value of $|0\rangle + |1\rangle$, corresponding to classical bit values of 0 or 1, respectively. And, the final state of these qubits may collectively represent a candidate solution of the problem, ideally the ground state of the quantum annealer 16 (e.g., the minimum of the optimization objective function).

In some other quantum annealing embodiments, the quantum annealer could have been built with non-superconducting technologies but leveraging cold atoms instead. This includes ion-trap architectures such as the quantum computers by IonQ or the neutral atoms architectures such as the quantum computers built by ColdQuanta, the University of Wisconsin-Madison, or the University of Colorado.

With this in mind, the processor 14 may first define an objective function of an ML detection algorithm that is to be minimized. This objective function may comprise a quadratic polynomial binary variables and exists in two equivalent forms—an Ising spin glass form and a quadratic unconstrained binary optimization (QUBO) form.

In the Ising spin glass form, solution variables may be referred to as "spins" $s_i \in \{+1, -1\}$ such that:

$$\hat{s}_1, \ldots \hat{s}_N = \arg\min_{\{s_1, \ldots s_N\}} \left( \sum_{i<j}^{N} g_{ij} s_i s_j + \sum_{i}^{N} f_i s_i \right). \quad \text{Eq. 2}$$

where N is a number of spin variables, and $g_{ij}$ and $f_i$ are the Ising model parameters that characterize a problem. The $f_i$ parameter may characterize the preference for each spin to be +1 or −1. A positive indicates a preference for −1 while a negative indicator preference for +1 with the magnitude corresponding to the magnitude of the preference for either state. The $g_{ij}$ parameter may capture preferred correlations between spins. For example, a positive may cause the quantum optimizer 16 to prefer $s_i \neq s_j$, while a negative may cause the quantum annealer 16 prefer $s_i = s_j$ in its optimization outcome. Analogous to $f_i$, the magnitude of $g_{ij}$ may correspond to the magnitude of its preference.

In the QUBO form, the optimization may have solution variables $q_i$ that are classical binary bits (i.e., logical "zero" or "1") that may be represented as:

$$\hat{q}_1, \ldots \hat{q}_N = \arg\min_{\{q_1, \ldots q_N\}} \sum_{i \leq j}^{N} Q_{ij} q_i q_j. \quad \text{Eq. 3}$$

where N is the qubit count and $Q \in \mathbb{R}^{N \times N}$ is upper triangular. The off diagonal matrix elements $Q_{ij}(i \neq j)$ correspond to $g_{ij}$ in Eq. 2 and the diagonal elements correspond to $f_i$. The two forms are equivalent and that their solutions are related by $$q_i \leftrightarrow \frac{1}{2}(s_i + 1) \quad \text{Eq. 4}$$

leading to $g_{ij} \leftrightarrow \frac{1}{4} Q_{ij}$ and $$f_i \leftrightarrow \frac{1}{2} Q_{ii} + \frac{1}{4} \sum_{k=1}^{i-1} Q_{ki} + \frac{1}{4} \sum_{k=i+1}^{N} Q_{ik}.$$

With the Ising spin glass and QUBO forms established, the ML detection algorithm can be transformed for the quantum annealer 16. As an example, an OFDM signaling technique is assumed where the wireless channel is subdivided into multiple "flat-fading" orthogonal sub carriers. The ML to Ising reduction may be required at each subcarrier. It should be noted, however, that the embodiment is not explicitly limited to OFDM techniques.

In transforming the ML problem for compilation in the quantum optimizer 16, the QUBO form is first considered. With the ML transformation to QUBO form, a variable to symbol transform function $T(\cdot)$ that represents a candidate vector v in the ML search process (e.g., Eq. 1) is first sought instead with a number of QUBO solution variables. More specifically, the processor 14 may represent each of the $N_T$ UE 15 candidate symbols $v_i \in O$ ($1 \leq i \leq N_T$) with $\log_2(|O|)$ QUBO solution variables naturally requiring QUBO variables for $N_T$ transmitters. The processor 14 may form these QUBO variables into a vector $q_i$ for each UE 15 as i: $q_i = [q(i-1) \cdot \log_2(|O|)+1, \ldots, q_i \cdot \log_2(|O|)]$. For example, T may recast a 2×2 QPSK (|O|=4) problem into a QUBO form with four solution variables split into two vectors, $q_1 = [q_1\ q_2]$ and $q_2 = [q_3\ q_4]$. Generally, this transformation recasts the ML problem of Eq. 1 into the form:

$$\hat{q}_1, \ldots \hat{q}_{N_t} = \arg\min_{q_1, \ldots q_{N_t}} \|y - He\|^2. \quad \text{Eq. 5}$$

where $e = [T(q_1), \ldots, T(q_{N_T})]^T$. Then, the resulting $N^T$ vectors $\hat{q}_1, \ldots \hat{q}_{N_t}$ correspond to the N QUBO solution variables $\hat{q}_1, \ldots \hat{q}_N$. Continuing with this 2×2 QPSK example, $e = [T(q_1), T(q_2)]^T = [T([q_1\ q_2]), T([q_3\ q_4])]^T$. Then, Eq. 5 results in two ML decoded vectors $\hat{q}_1, \hat{q}_2$ (e.g., noting that $T(\hat{q}_1), T(\hat{q}_2)$, corresponds to the ML solution $\hat{v} = [\hat{v}_1, \hat{v}_2]^T$ in Eq. 1, and the nearest symbol vector around a received y). The decoded vectors $\hat{q}_1, \hat{q}_2$ correspond to the four decoding QUBO variables $\hat{q}_1, \hat{q}_2, \hat{q}_3, \hat{q}_4$ in Eq. 3. If the transmitter's bit to symbol mapping and the variable to symbol transform of the quantum annealer 16 are equivalent, then the decoded $\hat{q}_1, \hat{q}_2, \hat{q}_3, \hat{q}_4$ are the directly de-mapped bits $\hat{b}$ from the ML solution in Eq. 1.

When the transform T is linear, expansion of the norm is Eq. 5 yields a quadratic polynomial objective function, since $q_i^2 = q_i$ for any 0 or 1 valued $q_i$. Then, the ML problem (e.g., Eq. 1) transforms directly into the QUBO form (e.g., the Eqs. 3 and 5). Then, the processor 14 finds variable to symbol linear transform functions for each BPSK, QPSK, and 16 QAM modulation.

For BPSK modulation, if two UE 15s send two signal simultaneously, (i.e., each with one of two possible information symbols), their transmissions can be described with a two-vector of symbols $\hat{v} = [\hat{v}_1, \hat{v}_2]^T \in [\{\pm 1\}, \{\pm 1\}]^T$. The ML problem applied to the BPSK case where symbols $v_1$ are represented by $v_i = T(q_i) = 2q_i - 1$ results in a QUBO form. An example of such is illustrated in FIGS. 3A-3D. For example in FIG. 3A, a 2×2 BPSK MIMO ML detection that solves Eq. 1 is converted into the QUBO form. The norm expansion in Eq. 1 can be expressed as illustrated in FIG. 3B. In the case of BPSK, the symbol $v_i \in \{-1, 1\}$ is represented by QUBO variable $q_i$. One possible transition is $2q_i - 1$, where $q_i = 0$ corresponds to $v_i = -1$ and $q_i = 1$ to $v_i = 1$. This generally leads to $[v_1, v_2]^T = [T(q_1), T(q_2)]^T$, where $T(q_1) = 2q_1 - 1$ and $T(q_2) = 2q_2 - 1$. Using these relationships, the norm may be expressed as that shown in FIG. 3C. Then, the objective function of the ML problem with QUBO variables can be obtained. For example, using $q_i^2 = q_i$, the minimization of the objective function becomes a QUBO form illustrated in FIG. 3D.

Higher-order modulations which may send one of M possible information symbols with each channel (e.g., where "M" is an integer greater than "2" and not necessarily equal to any other "M" reference designated herein) and result in higher communication rates are now considered. For example, in QPSK, each UE 15 transmits one of four possible symbols $\hat{v}_i \in \{\pm 1\}, \{\pm 1_j\}$. Since this can be viewed as a two-dimensional BPSK signal of $v_i = v_i^I + jv_i^Q$, the processor 14 may represent each possibly transmitted QPSK information symbol with a linear combination of one QUBO variable plus the other QUBO variable multiplied by the imaginary unit. Transforming $q_{2i-1}$ and $q_{2i}$ to $v_i^I$ and $v_i^Q$, respectively, leads to the transform $v_i = T(q_i) = (2q_{2i-1} - 1) + j(2q_{2i} - 1)$.

With 16 QAM and higher modulations, spectral efficiencies increase but they utilize multiple amplitudes (e.g., levels) so as to require a T that inputs more than one binary solution variable per I or Q channel. For example, consider a transform for a multilevel one-dimensional constellation of [00, 01, 10, 11]. In this example, $T = 4q_1 + 2q_2 - 3$ maps these bits to the values of $-3, -1, +1, +3$. The processor 14 may generalize this into a two-dimensional problem by letting the first two arguments of T (e.g., $q_{4i-1}, q_{4i-2}$) represent the channel I and the next two arguments represent the channel Q. Generally, this is the 16 QAM transform for the quantum optimizer 16. This transform map solution variables to symbols linearly as $v_i = T(q_i) = (4q_{4i-3} + 2q_{4i-2} - 3) + j(4q_{4i} + 2q_{4i} - 3)$, thereby resulting in a QUBO form.

Transmitters, however, typically use different bit to symbol mappings than would be used in the quantum optimizer 16. For example, in a 16 QAM signal, the constellation may be represented with the Gray coded bits illustrated in FIG. 4. This means that the quantum annealer's bit to symbol mapping differs from that of the UE 15. Thus, the processor 14 may map the decoding QUBO variables into the correct Gray coded transmitted bits.

In this embodiment, the Gray coding of the UE 15 may be retained and corrected by the processor 14. In doing so, the processor may perform a bitwise post translation that operates on a solution of output bits by the quantum annealer 16 (e.g., FIG. 3), essentially translating them back into Gray coded bits via the transition from FIGS. 4 to 7. For example, if the second bit $\hat{q}_{4i-2}$ of the QUBO solution bits $\hat{q}_{4i-3}, \hat{q}_{4i-2}, \hat{q}_{4i-1}, \hat{q}_{4i}$ is 1, then the processor 14 translates and flips the third bit $\hat{q}_{4i-1}$ and the fourth bit $\hat{q}_{4i}$ (e.g., 1100 to 1111). Otherwise, the processor 14 leaves the solution as is. This translation can be generalized to $2^{2n}$-QAM (e.g., where n≥2) as an operation that flips even-numbered column in the constellation upside down. The result b' is an intermediate code illustrated in FIG. 6. From there, the processor 14 may apply the differential bit encoding transformation of FIG. 5 to the intermediate code b' to obtain the gray coded bits in FIG. 4 (e.g., via the translation from 1111 to 1000).

Figures 4, 5, 6, 7:
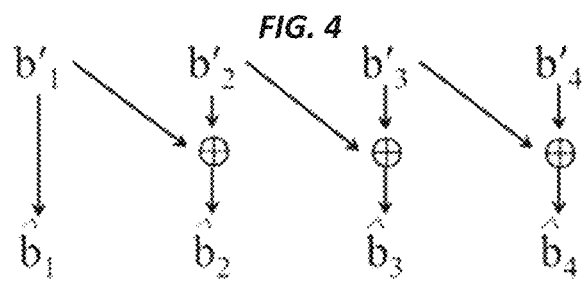
FIGS. 4-7 illustrate exemplary bitwise translations from a QAM signal onto a quantum annealer.

To illustrate, a UE 15 may map a bit string $b_1, b_2, b_3, b_4$ onto one of the gray coded 16 QAM symbols in FIG. 4) and send $\tilde{v} = [\overline{v_1}]$ to the WCP 20 through a wireless channel H. The WCP may receive $y = H\overline{v} + n$, the transmitted signal perturbed by AWGN. From there, the quantum annealer 16 may decode the ML QUBO equation using H, y, and $v = [v_1] = T(q_1)]$, where $T(q_1) = (4q_1 + 2q_2 - 3) + j(4q_3 + 2q_4) - 3)$, a linear transform based on the transform of the quantum optimizer 16, as illustrated in FIG. 7.

The quantum optimizer 16 may then solve the Ising/QUBO form of the ML detection problem resulting in an ML decoded vector $\hat{q}_1$ that includes Ising/QUBO variables $\hat{q}_1, \hat{q}_2, \hat{q}_3, \hat{q}_4$. Afterwards, the processor 14 may apply the bitwise translation from the decoding QUBO solution output $\hat{q}_1, \hat{q}_2, \hat{q}_3, \hat{q}_4$ to the transform illustrated in FIG. 4. Then, if $\hat{b}_1, \hat{b}_2, \hat{b}_3, \hat{b}_4 = b_1, b_2, b_3, b_4$, the quantum optimizer 16 has decoded successfully and the Gray coding of FIG. 4 is preserved in case of symbol error.

Now turning to the Ising spin glass form, the ML detection algorithm can be obtained by transforming the resulting QUBO form into an Ising form via Eq. 4. As mentioned, in one embodiment, the quantum annealer 16 is a D-wave 2000 quantum annealing machine. In such an embodiment, the quantum annealer 16 may implement the Ising model by using generalized Ising model parameters. For example, for BPSK modulation and given a channel matrix and vector of received signals, the quantum annealer 16 may obtain the following Ising model parameters:

$$f_i(H, y) = -2(H_{(:,i)}^I \cdot y^I) - 2(H_{(:,i)}^Q \cdot y^Q)$$

$$g_{ij}(H) = 2(H_{(:,i)}^I \cdot H_{(:,j)}^I) + 2(H_{(:,i)}^Q \cdot H_{(:,j)}^Q)$$

where $H_{(:,i)}$ denotes the $i^{th}$ column of the channel matrix H.

For QPSK modulation, the quantum annealer 16 may obtain the following Ising model parameter $f_i$ as follows:

$$f_i(H, y) = \begin{cases} \text{if } i = 2n \\ -2(H_{(:,i/2)}^I \cdot y^Q) + 2(H_{(:,i/2)}^Q \cdot y^I), \\ \text{otherwise,} \\ -2(H_{(:,\lceil i/2 \rceil)}^I \cdot y^I) + 2(H_{(:,\lceil i/2 \rceil)}^Q \cdot y^Q) \end{cases} \quad \text{Eq. 7}$$

Since the real and imaginary terms of each symbol are independent, the coupler strength between $s_{2n-1}$ and $s_{2n}$ (e.g., $q_{2n-1}$ and $q_{2n}$) is logical "0". For other $s_i$ and $s_j$, the Ising coupler strength for QPSK may be defined as:

$$g_{ij}(H) = \begin{cases} \text{if } i+j = 2n \\ -2(H^I_{(:,[i/2])} \cdot H^I_{(:,[j/2])}) + 2(H^Q_{(:,[i/2])} \cdot H^Q_{(:,[j/2])}), \\ \text{otherwise,} \\ \pm 2(H^I_{(:,[i/2])} \cdot H^Q_{(:,[j/2])}) \mp 2(H^I_{(:,[i/2])} \cdot H^Q_{(:,[j/2])}) \end{cases} \quad \text{Eq. 8}$$

where i<j and the sign of the latter case of Eq. 8 is determined by whether i=2n (i.e., when i=2n, then "+" and "−"). In the case of 16 QAM modulation, the Ising model parameter may follow the same structure as the BPSK and QPSK cases. These are illustrated in FIGS. 8A and 8B. For example, FIG. 8B illustrates the $f_i$ parameters for 16 QAM. Since the real and imaginary terms of each symbol are independent, the coupler strength between $s_{4n-2}$, $s_{4n-2}$, $s_{4n-1}$, $s_{4n}$ is "0". And, for the other $s_i$ and $s_j$, the Ising coupler strength $g_{ij}$ for 16 QAM is illustrated in FIG. 8B.

The Ising spin glass form may be generalized using Ising model parameters. In this regard, the quantum optimizer 16 may insert the given channel H and the signal y received by the receiver 12 without requiring any computationally expensive operations. For example, the quantum optimizer 16 may directly consider the expansion of the norm in Eq. 5. Thus, the computational time and resources required for the ML to quantum optimizer conversion can be neglected as they are generally insignificant.

Figure 9:
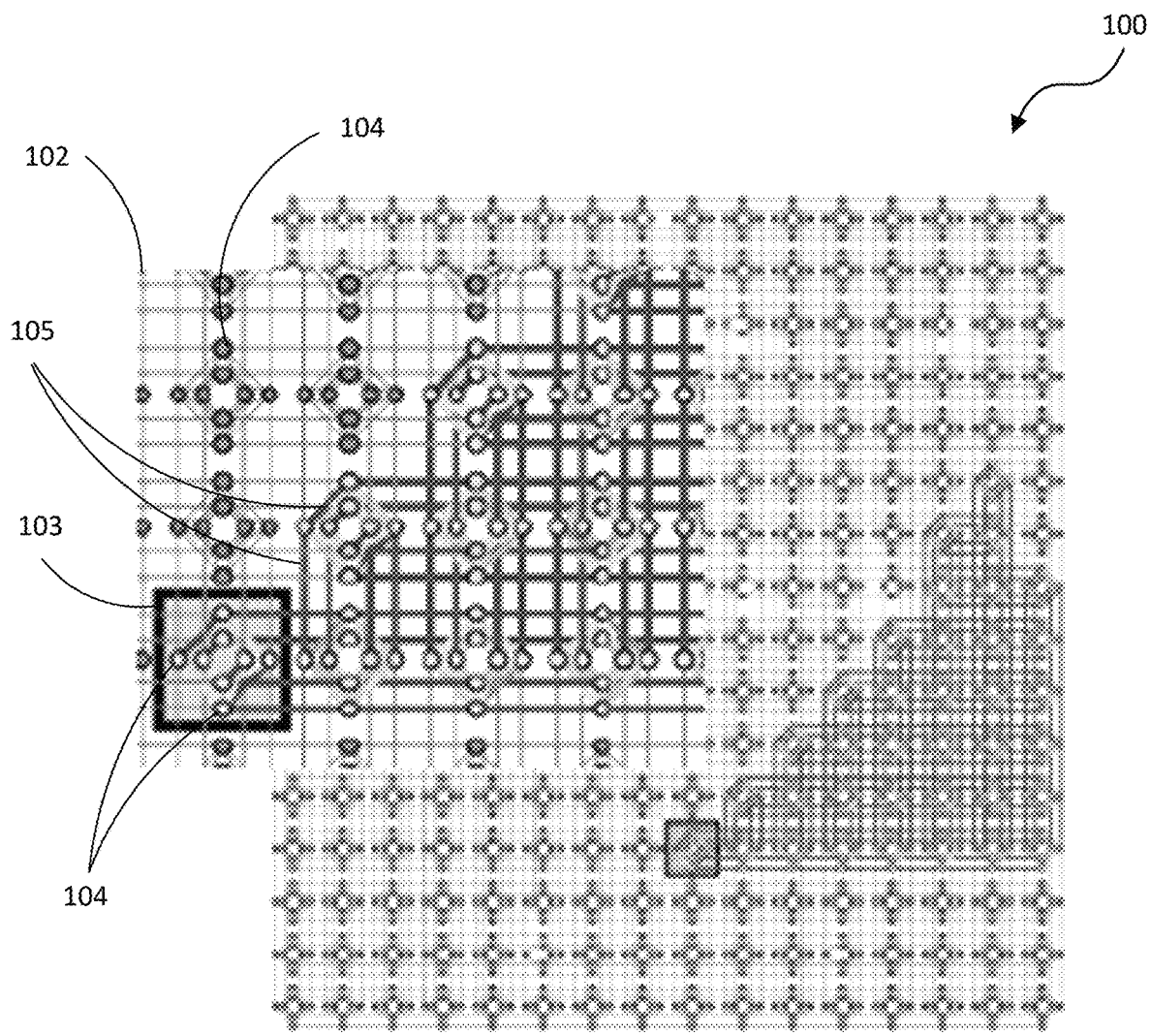
FIG. 9 illustrates a Chimera graph, in one exemplary embodiment.

Once the ML detection algorithm is in quadratic form, the processor 14 may compile the corresponding Ising model onto the quantum annealer 16. Again, in one embodiment, the quantum optimizer 16 is a D-Wave 2000 quantum annealer. In this regard, the quantum optimizer 16 may implement an Ising model objective function energetically hardcoded so that Eq. 2 can support a certain coefficient $g_{ij}$ to be nonzero if the variables $s_i$ and $s_j$ are associated to physical variables (i.e., physical qubits) in such a way that the qubits are energetically coupled. In this regard, the quantum optimizer 16 may use a coupling matrix, such as the Chimera graph 100 illustrated in FIG. 9. In some embodiments, the coupling matrix could be a Pegasus architecture as developed by D-Wave. In some embodiments, the compilation from Ising form could require a known mapping known as the LHZ scheme.

The Chimera graph 100 illustrates qubit connections for a 32×32 BPSK problem being embedded onto a quantum annealer, that could be the optimizer 16. The Chimera graph 100 comprises a plurality of Chimera unit cells 103 with each cell 103 comprising a set of eight physical qubits 104, as illustrated in the expanded section 102 of the Chimera graph 100. Each edge in the Chimera graph 100 is a coupler 105.

Once the Ising coefficients are passed to a quantum annealer 16, the coefficients are assigned to the edges/couplers 105 of the Chimera graph 100. The coefficients are divided into unit cells 103 (e.g., $g_{ij} \neq 0$ along with their connected nodes). While the Ising problem from Eq. 1 is almost fully connected (e.g., for most (i, j) pairs), the Chimera graph 100 allows for the embedding of the Ising problem.

Figure 10:
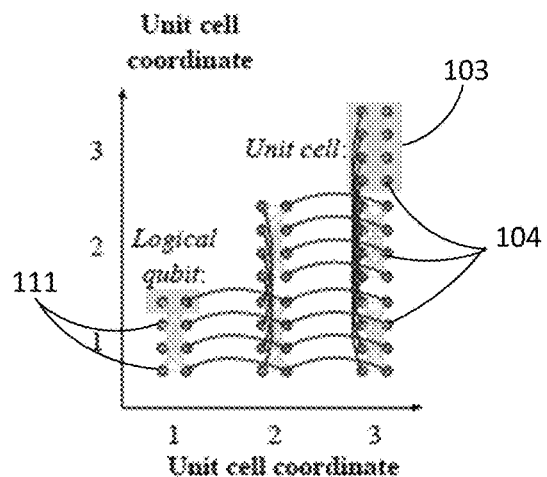
FIG. 10 illustrates one exemplary mapping of logical qubits onto physical qubits.

One method of embedding is to clone variables in such a way that a binary variable becomes associated not to a single qubit 104, but to a connected linear chain of qubits 104. FIG. 10 illustrates this cloning process as a mapping of logical qubits 111 onto physical qubits 104 of unit cells 103 in the Chimera graph 100 of FIG. 9. Each unit cell 103 comprises four logical qubits and the other unit cells 103 are employed in order to interconnect diagonal cells. More specifically, suppose the unit cell 103 with the coordinate value [1,1] includes logical qubits 1-4 and the unit cell 103 with the coordinate value [2, 2] includes logical qubits 5-8. The left side of the unit cell 103 with the coordinate value [2, 1] has a vertical clone of qubits 5-8 and the right side has a horizontal clone of logical qubits 1-4. Then, the logical qubits 1-4 and 5-8 are connected by a single unit cell 103 with the coordinate value [2, 1]. The unit cell 103 hosting the next four logical qubits 9-12 is placed at the coordinate value [3, 3]. The two unit cells below with the coordinate values [3, 1] and [3, 2] are used for connections between the logical qubits 9-12 and 1-4, and the logical qubits 9-12 and 5-8, respectively.

Given a number N of spin variables (i.e., logical qubits 111) in Ising form, the embedding may represent each with a chain of [N/4]+1 qubits, for a total of N ([N/4]+1) qubits (e.g., as $N=N_t \log_2(|O|)$).

The following table summarizes size of the embedding in both logical and physical qubits as a function of the MIMO detection problems parameters (i.e., a number of users, a number of antennas, and modulation type.

| Configuration | BPSK | QPSK | 16 QAM | 64 QAM |
| --- | --- | --- | --- | --- |
| 10 × 10 | 10 (40) | 20 (120) | 40 (440) | 60 (1000) |
| 20 × 20 | 20 (120) | 40 (440) | 80 (2000) | 120 (4000) |
| 40 × 40 | 40 (440) | 80 (2000) | 60 (7000) | 240 (15,000) |
| 60 × 60 | 60 (1000) | 120 (4000) | 240 (15,000) | 360 (33,000) |

After embedding onto the Chimera graph 100, the Ising problem needs to be recast into an equivalent problem that has the same ground state but also satisfies the Chimera graph 100 constraints. A constant penalty term ($J_F$) may need to be introduced to quantify the relatively large coupling that constrains the physical qubits belong to the same logical qubit to prefer the same state.

FIG. 11 illustrates additional details regarding this embedding. For example, the embedding a map the Ising problem to an equivalent one that has the same ground state but also satisfies the Chimera graph constraints (e.g., Chimera graph 100 of FIG. 9). The compiled objective function is represented in FIG. 10 where the original logical variables $s_i$ are associated to a chain i of c=1 . . . ([N/4]+1) qubits, indexed with spins $s_{ic}$. $|J_F|$ is operable to penalize a condition that $s_{ic} \neq s_{ic'}$, in that it enforces all qubits in the chain to assume the same value (±1). This enforcement may be more likely to happen for large values of $|J_F|$, however the maximum negative energy value may be set to −1 by design. $|J_F|$ effectively re-normalizes the terms in the objective function by a factor of $|J_F|^{-1}$. The linear term value $f_i$ is additionally divided by the number of qubits in the chain ([N/4]+1). The duplication of variables ensures the existence of a pair of qubits in the chains such that a physical coupler in the Chimera graph (e.g., Chimera graph 100 of FIG. 9) exists, where $\delta_{ij}$ is the set of pairs of qubits that are connected by a physical bond once the chains i and j are specified.

The bit string that the quantum optimizer 16 returns may be expressed in terms of the embedded Ising problem and is therefore decoded (e.g. "un-embedded") in order to have the values of the bits expressed in terms of the ML Ising problem. This may be performed by checking that all the qubits of a logical chain are either +1 or −1. Should not all spins be concordant, the value of the corresponding logical variable may be obtained by majority voting (e.g., in case of a vote tie, the value is randomized). Once the logical variables are determined, each configuration yields a corresponding energy of the Ising objective function by substituting it into the original Ising spin glass equation of Eq. 2.

An exemplary application programming interface (API) between the control plane, the quantum substrate, machine parameters and their tuning of the quantum annealer 16 are now explained. Each independent cycle (e.g. anneal cycle in a quantum annealer) on the quantum optimizer 16 generally yields a configuration of spins (e.g., one decoded bit string). The quantum optimizer 16 may be programmed to run a batch $N_a$ of cycles (e.g., one quantum annealing run) with the same parameters to accumulate statistics, which generally implies that there is a set of $N_a$ configurations from a job submission. The lowest energy configuration among $N_a$ anneals is generally the best answer found.

Multiple instances (e.g., identical or not) can be run physically alongside each other, reducing runtime by a parallelization factor $P_f \cong N_{tot}/(N([N/4]+1))$, which is generally considered to be a small 16 qubit problem in that it employs about 80 physical qubits (e.g., 16 user BPSK, 8 user QPSK, and 4 user 16 QAM) and could be run more than 20 times in parallel on the quantum annealer 16.

If the quantum optimizer 16 is an analog device, the desired embedded Ising coefficients (e.g., FIG. 11) do not perfectly match real energy values once hardcoded in the quantum annealer 16. Accordingly, these coefficients may give rise to intrinsic control errors (ICE), an uncontrollable shift in the actual program values of the objective function. ICE may be modeled as noise fluctuating at a timescale of the order of the anneal time. For example, on each anneal, Ising coefficients may be perturbed as $f_i \rightarrow f_i + \langle \delta f_i \rangle$, $g_{ij} \rightarrow g_{ij} + \langle \delta g_{ij} \rangle$, where the noise is Gaussian with a mean and variance of $\langle \delta f_i \rangle \cong 0.008 \pm 0.02$ and $\langle \delta g_{ij} \rangle \cong -0.015 \pm 0.025$, measured respectively, in a delicate phase of the annealing run. The impact of ICE on performance may depend on the problem, but precision issues may arise if the largest energy scale squeezes the value of the coefficients in FIG. 11 to a level where ICE is likely to raise significant information of the problems ground state configuration.

As mentioned, the value of $|J_F|$ that enforces a chain of qubits to return a series of values which are in agreement (e.g., all +1 or −1) and the annealing time $T_a$ may both be important performance parameters that determine the net time to find a solution and illustrate the overall performance of the quantum annealer 16. Pause times $T_p$ (e.g., 1, 10 and 100 μs) in the middle of the annealing (e.g., $T_a$ equals 1 μs) with various pause positions $S_p$ may be introduced to illustrate the effect of pausing on the problems. Setting $|J_F|$ too large may "wash out" the problem information due to the ICE. But, $|J_F|$ on average may increase with the number of logical chains and fully connected problems in the absence of ICE.

In one embodiment, the dynamic range of coupler strengths may be defined as the ratio between the maximum and minimum values that can be set (e.g., $g_{ij}$ in Eq. 2). To strengthen interactions between embedding qubits, the quantum annealer 16 may be able to double the magnitude of valid negative coupler values, effectively increasing the precision of embedded problems and reducing ICE. However, this improved range option, when enabled, may break the symmetry of the Ising objective function by substituting the opposite signs for connected coefficients and their couplings into the same problem. Accordingly, the improved range option may preclude averaging over symmetrical instances as a quantum optimizer 16 may do so without the improved range option to mitigate leakage errors.

In one embodiment, the quantum annealer used as the quantum optimizer 16 was evaluated considering the same number of antennas at the UEs 15 and the WCP 20 (e.g., where $N_t = N_r$ above). In these evaluations, certain metrics were determined such as the time to solution (TTS), BER, and the time to BER (TTB). In determining the time to solution, a ground state with a probability of $\mathcal{P}_0$ may have been found corresponding to the minimum energy solution within the search space of $2^N$ bit strings, where N is the variable count. In the absence of channel noise, the ground state corresponds to a correct decoding. Each anneal may be considered an independent identically distributed random process, meaning that the expected time to solution (i.e., TTS($\mathcal{P}$)) is an anneal time of each anneal multiplied by the expected number of samples to be able to find the ML solution with a probability $\mathcal{P}$. In this embodiment, TTS($\mathcal{P}$)=$T_a$ log (1−$\mathcal{P}$) log (1−$\mathcal{P}_0$), where $\mathcal{P}$ is routinely established at 0.99.

In evaluating the BER and the TTB, the TTS reflects the expected time to find the ground state but does not characterize the expected time that the quantum annealer 16 takes to achieve a certain BER. This quantity may differ from the TTS because the TTS generally only considers the ground state. Solutions with energy greater than the ground state may have no or relatively few bit errors even though wireless channel noise may induce bit errors in the ground state solution itself. Accordingly, a metric TTB(p) is introduced to characterize the time required to obtain a certain BER.

In this embodiment, the TTB(p) for a single channel use is illustrated. Since one run of the quantum annealer 16 may include multiple Na anneals, the annealing solution with minimum energy among all anneals in that run may be returned. This process included one instance with a channel use comprised of certain transmitted bits and a certain wireless channel. In this embodiment, the quantum annealer 16 found different solutions with different Ising energies ranking them in order of their energy. Generally, the quantum optimizer 16 only finds the best solution by all anneals in a run such that the expected BER of an instance I after $N_a$ anneals can be expressed as:

$$\mathbb{E}(BER(N_a)) = \sum_{k=1}^{L} \left[ \left( \sum_{r=k}^{L} p_I(r) \right)^{N_a} - \left( \sum_{r=k+1}^{L} p_I(r) \right)^{N_a} \right] \cdot F_I(k)/N \qquad \text{Eq. 9}$$

where N is the qubit count, L(≤$N_a$) is a number of distinct solutions, r(1≤r≤L) is a rank index of each solution, p(r) is the probability of obtaining the $r_{th}$ solution, and is $F_I(k)$ the number of bit errors of the solution against ground truth. To compute the TTB(p), the left-hand side of Eq. 9 is replaced with p, such that $N_a$ may be solved for and TTB(p)= $N_a T_a/\mathcal{P}_f$ may be computed.

Figure 12:
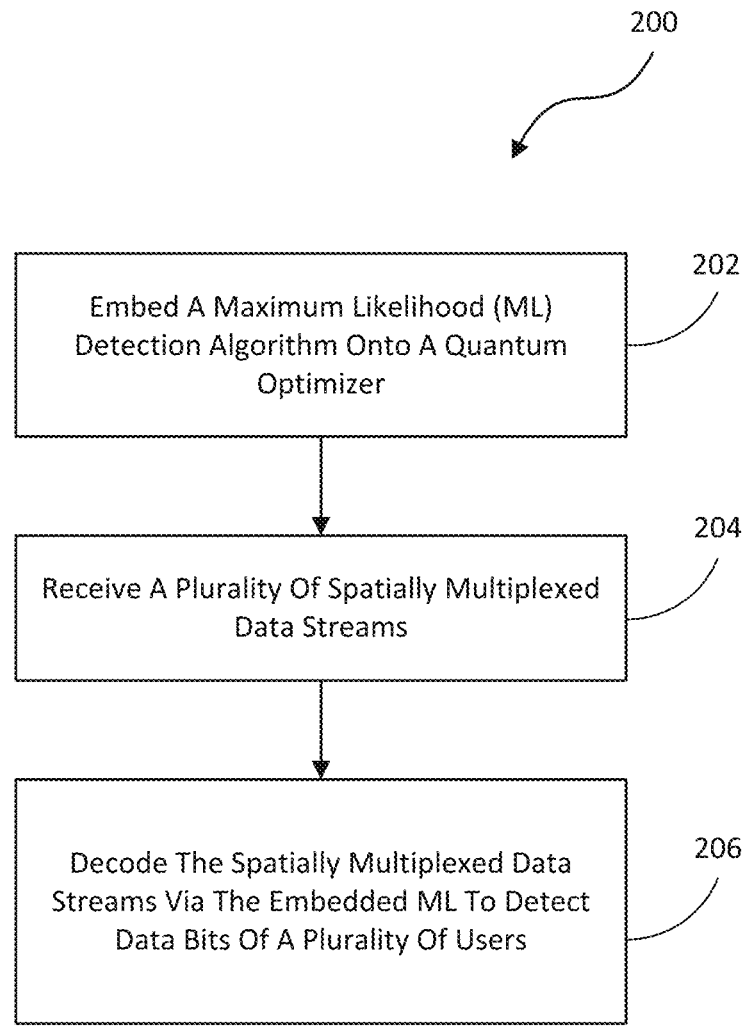
FIG. 12 is a flowchart of an exemplary process of the system of FIG. 1.

FIG. 12 is a flowchart of an exemplary process 200 of the system 10 of FIG. 1. In this embodiment, an ML detection algorithm is embedded on the quantum annealer 16, in the process element 202. For example, the processor 14 may reduce the ML detection algorithm into a quadratic form such that it may be embedded onto qubits of the quantum annealer 16. With the ML detection algorithm embedded onto the quantum annealer 16, the receiver 12 may receive a plurality of spatially multiplexed data streams, in the process element 204 (e.g., via Wi-Fi, cellular telephony, coaxial cable, etc.). Then, the quantum optimizer 16 may decode the spatially multiplexed data streams via the embedded ML detection algorithm to detect the data bits of a plurality of users, such as the UEs 15 illustrated in FIG. 2, in the process element 206.

Figure 13:
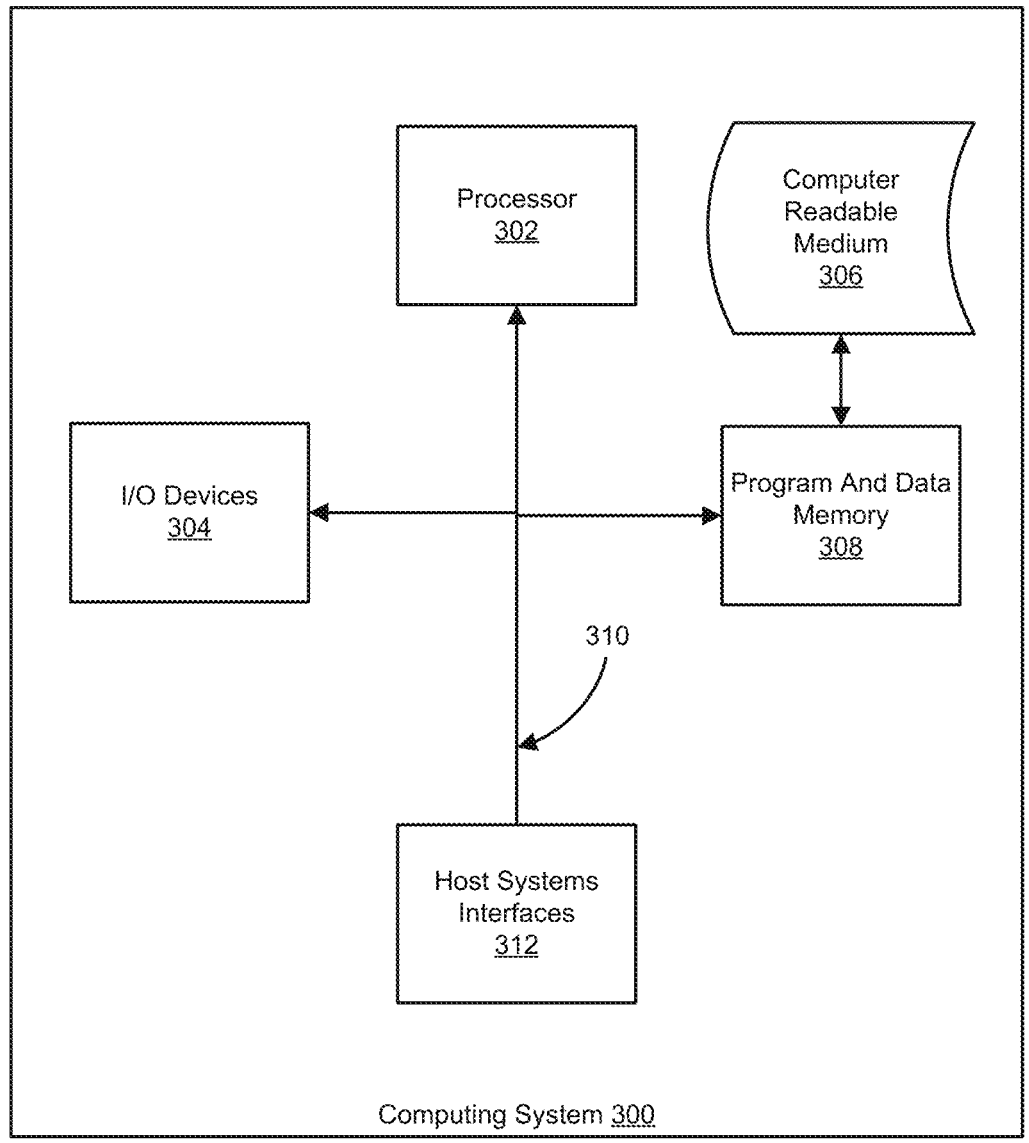
FIG. 13 is a block diagram of an exemplary computing system in which a computer readable medium provides instructions for performing methods herein.

Any of the above embodiments herein may be rearranged and/or combined with other embodiments. Accordingly, the concepts herein are not to be limited to any particular embodiment disclosed herein. Additionally, the embodiments can take the form of entirely hardware or comprising both hardware and software elements. Portions of the embodiments may be implemented in software, which includes but is not limited to firmware, resident software, microcode, etc. FIG. 13 illustrates a computing system 300 in which a computer readable medium 306 may provide instructions for performing any of the methods disclosed herein.

Furthermore, the embodiments can take the form of a computer program product accessible from the computer readable medium 306 providing program code for use by or in connection with a computer or any instruction execution system. For the purposes of this description, the computer readable medium 306 can be any apparatus that can tangibly store the program for use by or in connection with the instruction execution system, apparatus, or device, including the computer system 300.

The medium 306 can be any tangible electronic, magnetic, optical, electromagnetic, infrared, or semiconductor system (or apparatus or device). Examples of a computer readable medium 306 include a semiconductor or solid state memory, magnetic tape, a removable computer diskette, a random access memory (RAM), NAND flash memory, a read-only memory (ROM), a rigid magnetic disk and an optical disk. Some examples of optical disks include compact disk—read only memory (CD-ROM), compact disk—read/write (CD-R/W) and digital versatile disc (DVD).

The computing system 300, suitable for storing and/or executing program code, can include one or more processors 302 coupled directly or indirectly to memory 308 through a system bus 310. The memory 308 can include local memory employed during actual execution of the program code, bulk storage, and cache memories which provide temporary storage of at least some program code in order to reduce the number of times code is retrieved from bulk storage during execution. Input/output or I/O devices 304 (including but not limited to keyboards, displays, pointing devices, etc.) can be coupled to the system either directly or through intervening I/O controllers. Network adapters may also be coupled to the system to enable the computing system 300 to become coupled to other data processing systems, such as through host systems interfaces 312, or remote printers or storage devices through intervening private or public networks. Modems, cable modem and Ethernet cards are just a few of the currently available types of network adapters.

What is claimed is:

1. A Multi-Input/Multi-Output (MIMO) processing system, comprising:
    a receiver operable to receive a plurality of spatially multiplexed data streams; and
    a processor operable to embed a maximum likelihood (ML) detection algorithm onto a quantum optimizer, and to decode the spatially multiplexed data streams via the embedded ML to detect data bits of a plurality of users.

2. The MIMO processing system of claim 1, wherein:
    the processor is further operable to reduce the ML detection algorithm to a Quadratic Unconstrained Binary Optimization (QUBO) form.

3. The MIMO processing system of claim 1, wherein:
    the processor is further operable to reduce the ML detection algorithm to an Ising form.

4. The MIMO processing system of claim 1, wherein:
    the processor is further operable to estimate a time to detect the data bits of the plurality of users based on a selectable bit error rate (BER).

5. The MIMO processing system of claim 4, wherein:
    the processor is further operable to estimate the time to detect the data bits based on at least one measurement of channel noise, machine noise, modulation order, user count, base station antenna count, or quantum device noise.

6. The MIMO processing system of claim 1, wherein:
    the receiver is configured with at least one of a Radio Access Network (RAN), a cloud RAN, a wireless access point, or an eNodeB.

7. The MIMO processing system of claim 1, wherein:
    the plurality of spatially multiplexed data streams comprises at least one of a bi-phase shift keyed modulation, a quadrature-phase shift keyed modulation, a quadrature amplitude modulation, or an orthogonal frequency division multiplexing scheme.

8. The MIMO processing system of claim 1, wherein:
    the quantum optimizer comprises at least one of a coherent optical machine, a complementary metal-oxide-semiconductor (CMOS) based digital annealer, a gate model quantum computer, or a superconducting based quantum annealer.

9. A Multi-Input/Multi-Output (MIMO) processing method, comprising:
    embedding a maximum likelihood (ML) detection algorithm onto a quantum optimizer;
    receiving a plurality of spatially multiplexed data streams; and
    decoding the spatially multiplexed data streams via the embedded ML to detect data bits of a plurality of users.

10. The method of claim 9, further comprising:
    reducing the ML detection algorithm to a Quadratic Unconstrained Binary Optimization (QUBO) form.

11. The method of claim 9, further comprising:
    reducing the ML detection algorithm to an Ising form.

12. The method of claim 9, further comprising:
    estimating a time to detect the data bits of the plurality of users based on a selectable bit error rate (BER).

13. The method of claim 12, further comprising:
    estimating the time to detect the data bits based on at least one measurement of channel noise, machine noise, modulation order, user count, base station antenna count, or quantum device noise.

14. The method of claim 9, wherein:
    the method is operable with a receiver configured with at least one of a Radio Access Network (RAN), a cloud RAN, a wireless access point, or an eNodeB.

15. The method of claim 9, wherein:
    the plurality of spatially multiplexed data streams comprises at least one of a bi-phase shift keyed modulation, a quadrature-phase shift keyed modulation, a quadrature amplitude modulation, or an orthogonal frequency division multiplexing scheme.

16. A non-transitory computer readable medium comprising instructions that, when executed in a processor comprising a quantum optimizer, direct the processor to:
    embed a maximum likelihood (ML) detection algorithm onto the quantum optimizer;
    receive a plurality of spatially multiplexed Multi-Input/Multi-Output (MIMO) data streams; and
    decode the spatially multiplexed MIMO data streams via the embedded ML to detect data bits of a plurality of users.

17. The computer readable medium of claim 16, further comprising instructions that direct the processor to:
reduce the ML detection algorithm to a Quadratic Unconstrained Binary Optimization (QUBO) form.

18. The computer readable medium of claim 16, further comprising instructions that direct the processor to:
reduce the ML detection algorithm to an Ising form.

19. The computer readable medium of claim 16, further comprising instructions that direct the processor to:
estimate a time to detect the data bits of the plurality of users based on a selectable bit error rate (BER).

20. The computer readable medium of claim 19, further comprising instructions that direct the processor to:
estimate the time to detect the data bits based on at least one measurement of channel noise, machine noise, modulation order, user count, base station antenna count, or quantum device noise.

21. The computer readable medium of claim 16, wherein:
the processor is operable with a receiver configured with at least one of a Radio Access Network (RAN), a cloud RAN, a wireless access point, or an eNodeB.

22. The computer readable medium of claim 16, wherein:
the plurality of spatially multiplexed data streams comprises at least one of a bi-phase shift keyed modulation, a quadrature-phase shift keyed modulation, a quadrature amplitude modulation, or an orthogonal frequency division multiplexing scheme.

* * * * *